UNITED STATES PATENT OFFICE.

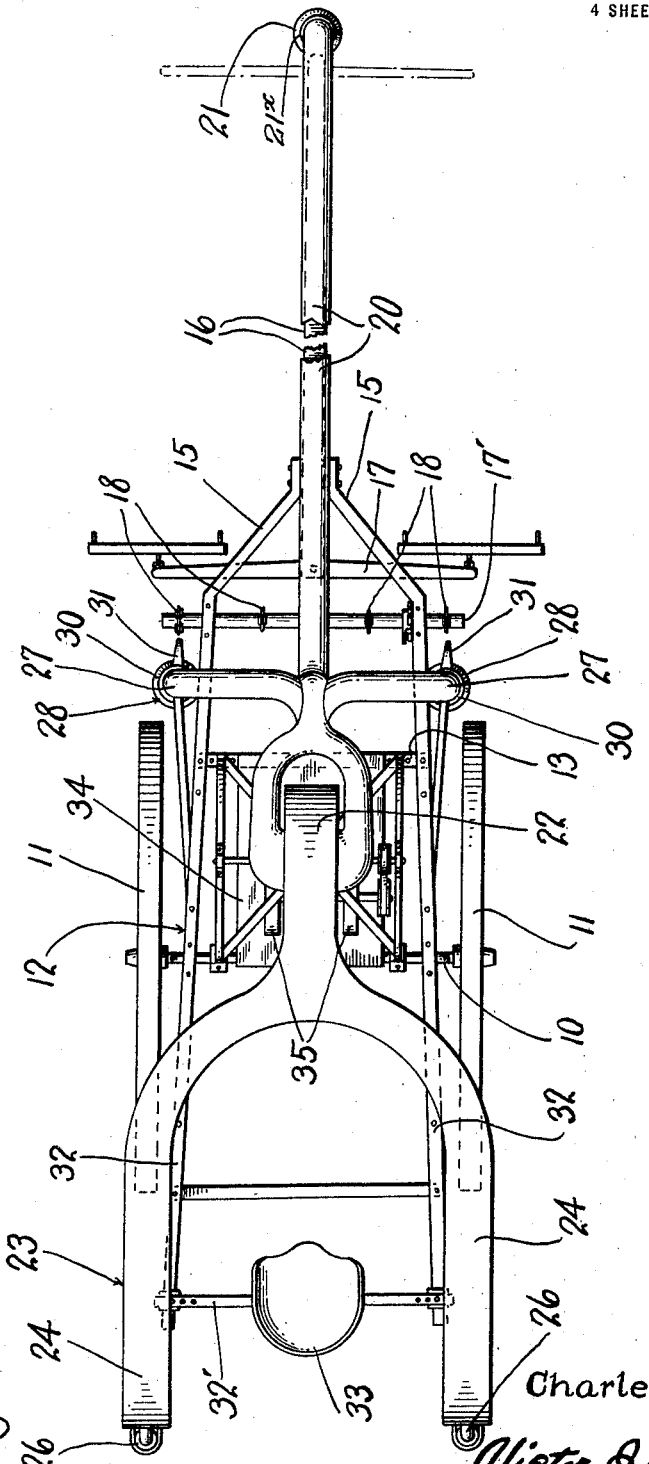

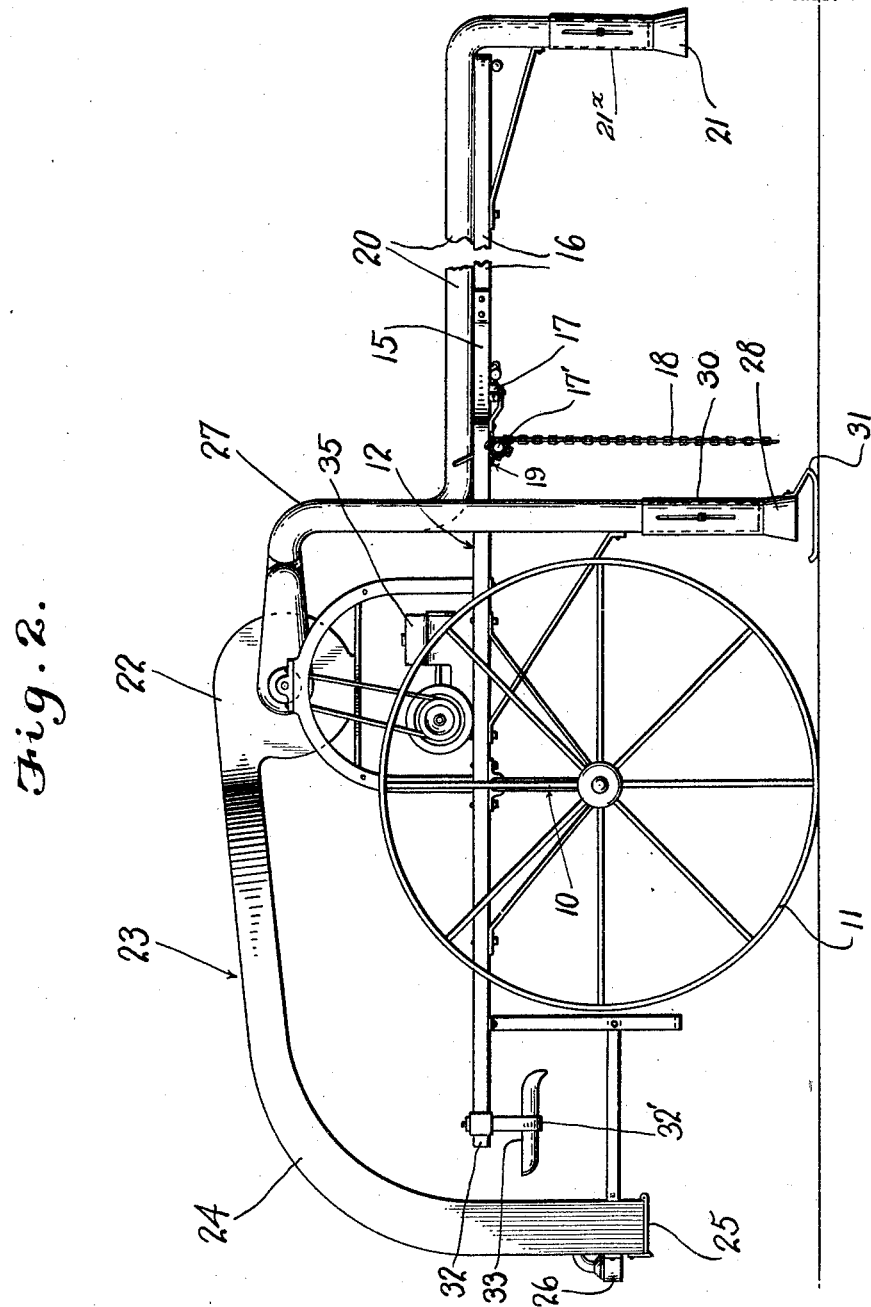

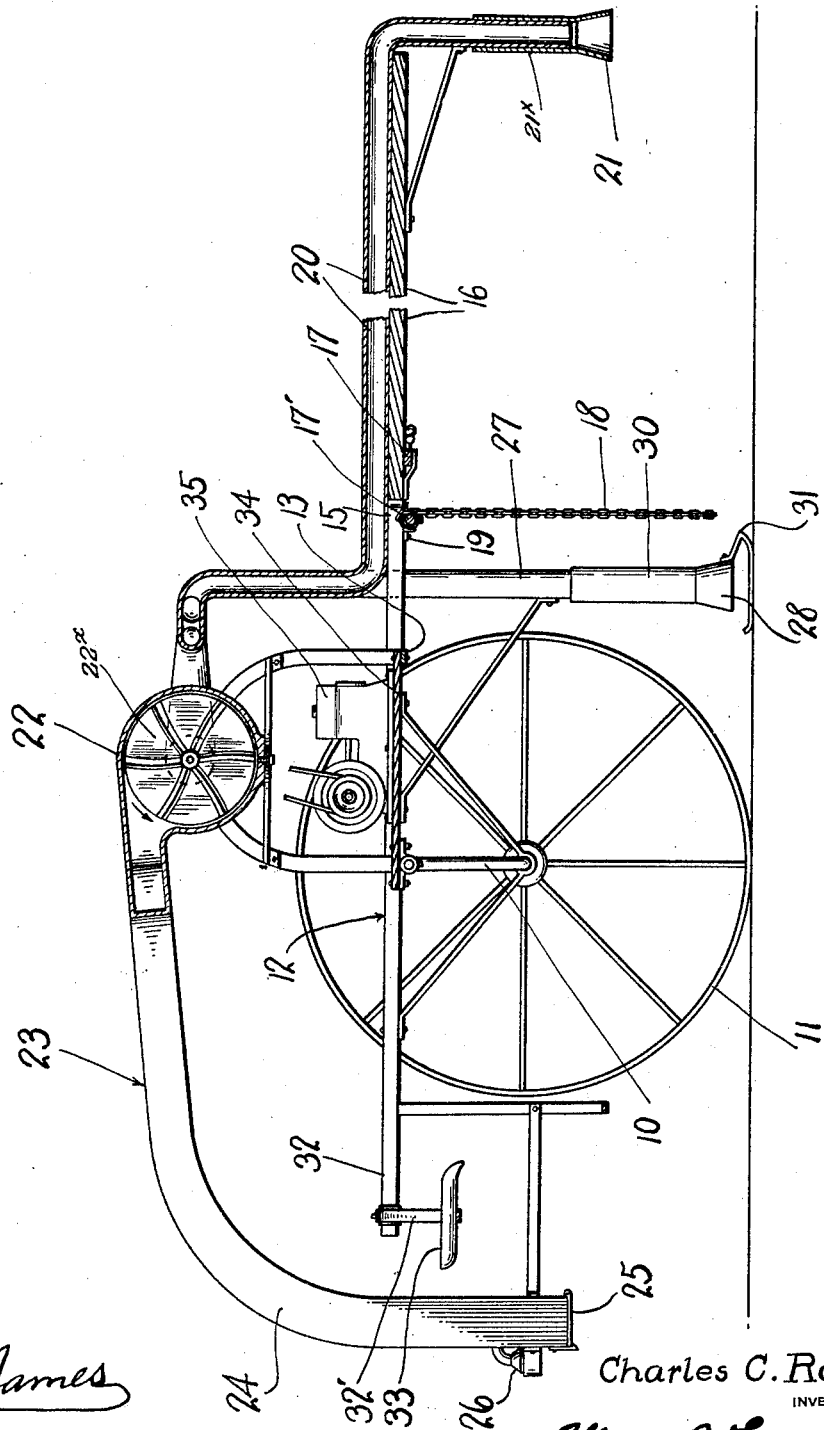

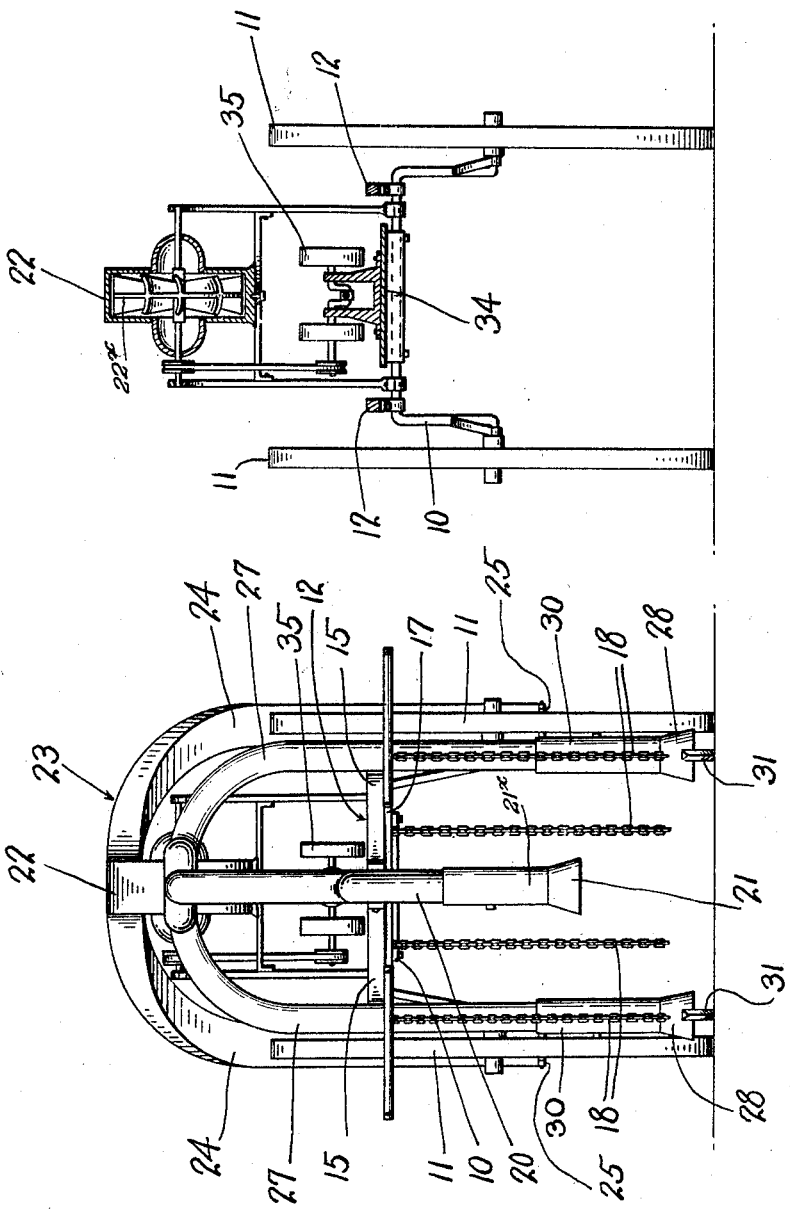

CHARLES C. ROE, OF WOLFE CITY, TEXAS.

WEEVIL-EXTERMINATOR.

1,400,459.　　　　Specification of Letters Patent.　　Patented Dec. 13, 1921.

Application filed November 2, 1920. Serial No. 421,320.

*To all whom it may concern:*

Be it known that I, CHARLES C. ROE, a citizen of the United States, residing at Wolfe City, in the county of Hunt and State of Texas, have invented new and useful Improvements in Weevil-Exterminators, of which the following is a specification.

The object of the invention is to provide a comparatively simple and effective apparatus for removing boll weevils from cotton plants and also removing from the plants prior to the harvesting period the injured or affected leaves and fruit which have been attacked by the boll weevil so that further injury to the plants may be prevented, and at the same time to gather from the ground at the roots of the rows of cotton plants the leaves and rubbish thus detached from the plants, so that in the harvesting of the cotton a cleaner and higher grade of product can be obtained without the losses and inconveniences incident to present methods in that connection, and with these objects in view the invention consists in a construction, combination and relation of parts of which a preferred embodiment is illustrated in the accompanying drawing, wherein:

Figure 1 is a plan view of the apparatus;

Fig. 2 is a side view of the same;

Fig. 3 is a longitudinal section;

Fig. 4 is a front view;

Fig. 5 is a transverse section.

Extending forward from the axle 10 upon which are mounted the ground wheels 11 is a frame having the side bars 12 connected transversely by a cross beam 13 and having the forwardly convergent frame bars 15 with which is connected the tongue 16, and while the apparatus shown is particularly adapted to be horse drawn and therefore is indicated as provided with a double-tree 17, it will be understood that it may if preferred be tractor drawn, the advantage in the horse drawn apparatus however being that a span of horses may be conducted on either side of a row of cotton plants with the tongue extending over the row as indicated. Depending from a suitable bracket rod 17' supported by the tongue is a series of flexible pendant agitators 18, consisting of chains which are preferably wound upon the bracket bar which consists as shown of a roller mounted in a suitable bearing 19 on the tongue and adapted to be adjusted to the length to which the agitator chains are extended, the functions of said chains being to strike the leaves and branches of the cotton plant and detach therefrom the dead or injured foliage or blossoms or bolls so that this debris containing the insects which are to be destroyed is caused to drop to the ground adjacent to the row of plants. Also carried by the tongue and in a position to pass over the tops of but adjacent to the plants is a suction pipe 20 having a flared inlet end or mouth 21 and extending rearward to a suction fan casing 22, so that the insects upon the leaves and other parts of the plant which have not been rendered sufficiently dry or brittle to be detached, may be drawn into the suction tube and carried rearwardly therethrough and deposited in a Y-shaped receptacle 23 which extends rearwardly from the axle with its arms 24 provided with bottom outlet doors 25 which may be opened from time to time to deposit the contents, consisting of leaves and the insects upon the ground where the latter may be effectively destroyed. The suction fan in the casing 22 is designated by 23×. In order to insure the destruction of the insects, sulfur boxes 26 may be arranged in communication with the arms of the receptacle and burning sulfur may be deposited therein so that the fumes will permeate the interior of the receptacle.

Also in communication with said fan casing and affected by the blast of air produced thereby are the side conveyers 27 of which the flared inlet ends 28 are located near the surface of the ground in front of the ground or supporting wheels of the apparatus, and therefore close to the row of cotton plants on either side thereof, to suctionally pick up the leaves and rubbish detached from the plants by the agitator element above described, together with the insects which may have been detached therewith, so that all may be carried rearwardly into the above indicated receptacle for subsequent destruction. In order that the inlet ends of these side conveyers may operate at a relatively uniform distance from the surface of the ground, they may be provided with telescoping sections 30 supported by runners 31 which traverse the surface of the ground and therefore follow the irregularities thereof, to insure the removal and safe deposit of all of the loose leaves and rubbish adjacent to the row of cotton plants.

The flared end or mouth 21 of the suction pipe 20 is preferably carried by a sleeve section 21ˣ which is adjustable vertically on the pendent portion of the pipe 20 so as to position the mouth 21 at different distances above the ground according to the height of the flange.

Supported by the frame of the machine are the rearwardly extending arms 32 intermediately braced from the axle as indicated at 32′ and supporting the hammock seat 33 for the driver of the apparatus, and mounted upon a platform 34 supported between the axle and the cross bar of the frame is the engine 35 for operating the fan, any suitable motor as of the gasolene type being suitable for use in this connection.

Thus the apparatus, whether horse drawn or otherwise is adapted to follow a row of cotton plants and in addition to removing from the foliage and blossoms or bolls the insects or bugs which are detachable by suction, it being understood that a suction of any desired intensity may be provided by the use of a suitable suction fan, the remaining insects or bugs together with the loose or dried leaves and so forth may be detached by means of the pendant agitators, so as to fall to the ground near the row of plants and this rubbish with the detached insects will then be taken up by the nozzles of the suction apparatus which are located near the surface of the ground and follow the row on each side thereof, all of the accumulations being carried back by the suction fan to be deposited in the receptacles provided for that purpose, and at intervals these accumulations can be discharged from the receptacles and burned or removed, so as to minimize the damage to the growing plant and to the ultimate crop.

Having described the invention what is claimed is:—

1. An apparatus for the purpose indicated having a supporting frame and wheels for supporting the frame in standing relation with a row of cotton plants, said frame having a forwardly extending tongue, a suction device having a main nozzle supported by said tongue over the tops of the plants in the row traversed, flexible pendant agitators also supported by said tongue to drag upon the plants, auxiliary nozzles also in communication with the suction device and disposed with their inlet ends adjacent to the ground in advance of the wheels of said frame, and downwardly and rearwardly inclined receptacles also in communication with the suction device to receive the objects collected by said nozzles.

2. An apparatus for the purpose indicated having a supporting frame and wheels for maintaining the same in standing relation with a row of cotton plants, a suction device having a main nozzle disposed in downwardly open relation with a row of plants spanned by said frame, and also provided with auxiliary side nozzles for traversing the ground at either side of the row of plants and in advance of said frame supporting wheels, a receptacle in communication with the suction device and arranged in rear of the supporting frame to receive the objects collected by said nozzles, and an agitator consisting of a roller arranged transversely with relation to the line of progress of the machine, and having flexible, terminally pendant chains reeled thereon for contact with the foliage of the plants in the row thus traversed.

3. An apparatus for the purpose indicated having a frame and supporting wheels for disposing said frame in spanning relation with a row of cotton plants, a suction device having a main nozzle disposed in advance of the frame and directed downwardly to follow a path above the tops of the plants, said suction device also having a plurality of auxiliary nozzles arranged for movement close to the ground in paths parallel with the row of plants, said auxiliary nozzles having axially movable sections, and runners connected with said sections and traversing the surface of the ground to maintain the inlet ends of the nozzles at a uniform distance from the said surface, and a receptacle located in rear of the suction device and in communication therewith to receive the objects collected by said nozzles.

4. An apparatus for the purpose indicated having a supporting frame and ground wheels, flexible agitators for contact with the foliage of the cotton plants in the row in advance of the frame, a suction device having a fan and operating means for the same mounted upon the frame, said suction device having a main nozzle disposed to traverse the row of plants and auxiliary nozzles to operate at either side of the plane of said row and adjacent to the surface of the ground and a Y-shaped receptacle arranged in communication with the suction device and in rear thereof and having rearwardly and downwardly extended arms provided with discharge doors or closures, said receptacle arms being also provided with sulfur chambers in communication with the interior of the receptacle.

In testimony whereof I affix my signature.

CHARLES C. ROE.